United States Patent [19]

Trimble

[11] 4,240,610
[45] Dec. 23, 1980

[54] HIGH PRESSURE BELLOWS ASSEMBLY

[75] Inventor: Edward F. Trimble, Cumberland, R.I.

[73] Assignee: EG & G Sealol, Inc., Warwick, R.I.

[21] Appl. No.: 41,917

[22] Filed: May 23, 1979

[51] Int. Cl.³ .................. F16K 31/44; F16K 41/10
[52] U.S. Cl. .............................. 251/335 B; 277/200
[58] Field of Search ............... 251/335 B, 266; 92/39, 92/44, 45; 277/200

[56] References Cited

U.S. PATENT DOCUMENTS

| | | | |
|---|---|---|---|
| 1,289,434 | 12/1918 | Fulton | 92/44 |
| 2,482,780 | 9/1949 | Kirby, Jr. | 251/335 B |
| 2,637,301 | 5/1953 | Burdick | 137/86 |
| 3,229,067 | 1/1966 | Schockett | 200/153 V |
| 3,278,156 | 10/1966 | Callahan et al. | 251/335 B |
| 3,731,595 | 5/1973 | Wentworth, Jr. | 92/43 X |
| 3,802,322 | 4/1974 | Johnson et al. | 92/39 |
| 4,040,445 | 8/1977 | McCormick | 251/335 B X |

FOREIGN PATENT DOCUMENTS 1023942  2/1958  Fed. Rep. of Germany ....... 251/335 B

*Primary Examiner*—Martin P. Schwadron
*Assistant Examiner*—A. Michael Chambers

*Attorney, Agent, or Firm*—Finnegan, Henderson, Farabow, Garrett & Dunner

[57] ABSTRACT

A high pressure bellows assembly installed in a valve which includes a housing, inlet and outlet ports connected by a passageway, a valve seat in the passageway, a valve stem movably supported on the housing and extending into a pressure chamber in the housing and having a valve plug engageable with the valve seat; the bellows assembly including a pair of bellows segments arranged in tandem along the valve stem in the chamber and sealingly interconnected by a floating collar. One end of the bellows assembly is sealed to the housing, and the other end sealed to the valve stem. Restraining members are disposed exteriorly of each bellows segment to limit expansion of the bellows segments and support them laterally. The restraining members at one end of the bellows assembly are fixed relative to the housing while the restraining members at the other assembly end are fixed relative to the stem. Each restraining member overreaches the floating collar and abuttingly engages it on the side opposite the fixed end of the members to allow for contraction of but limit expansion of the bellows segments.

9 Claims, 4 Drawing Figures

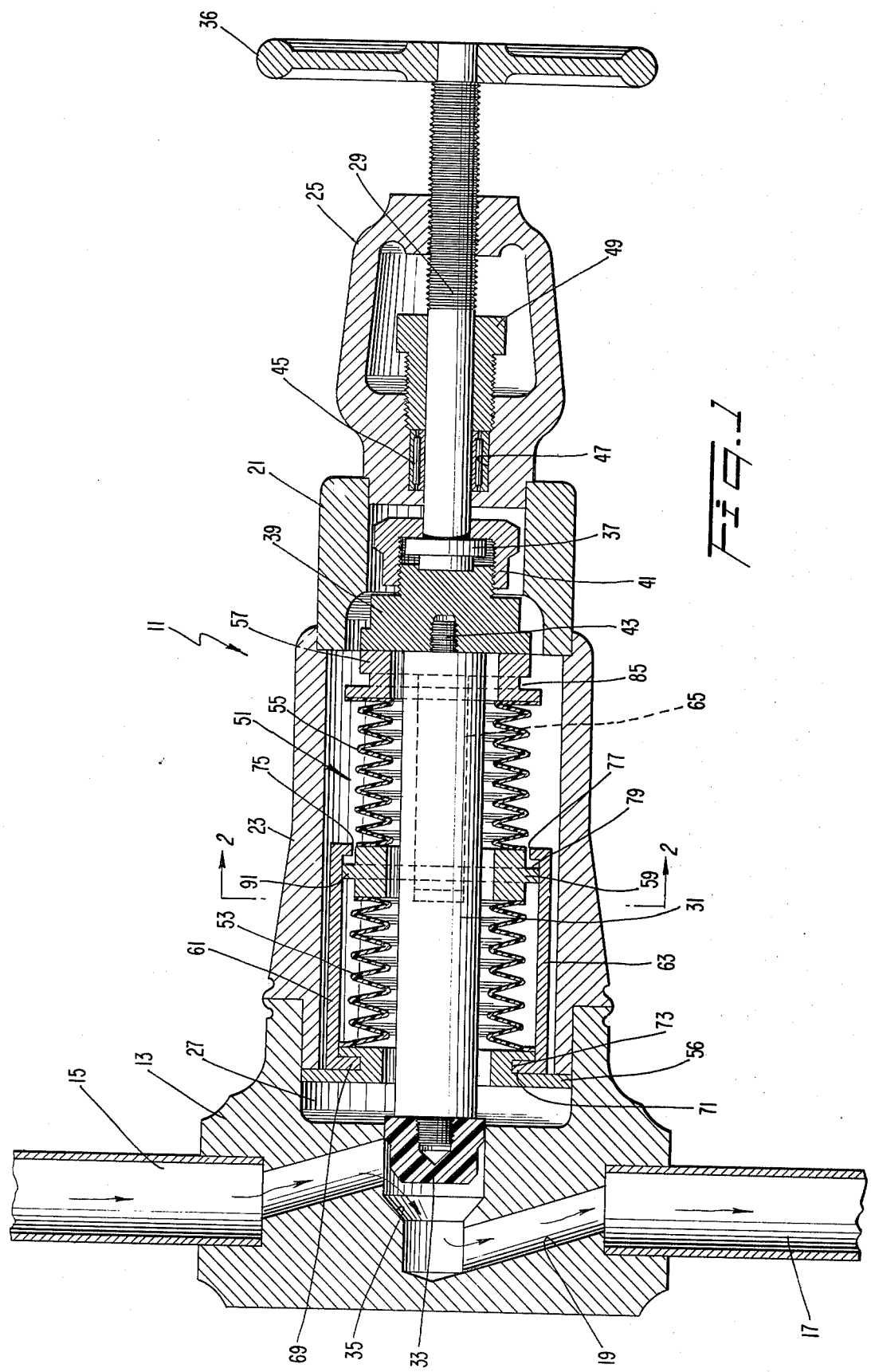

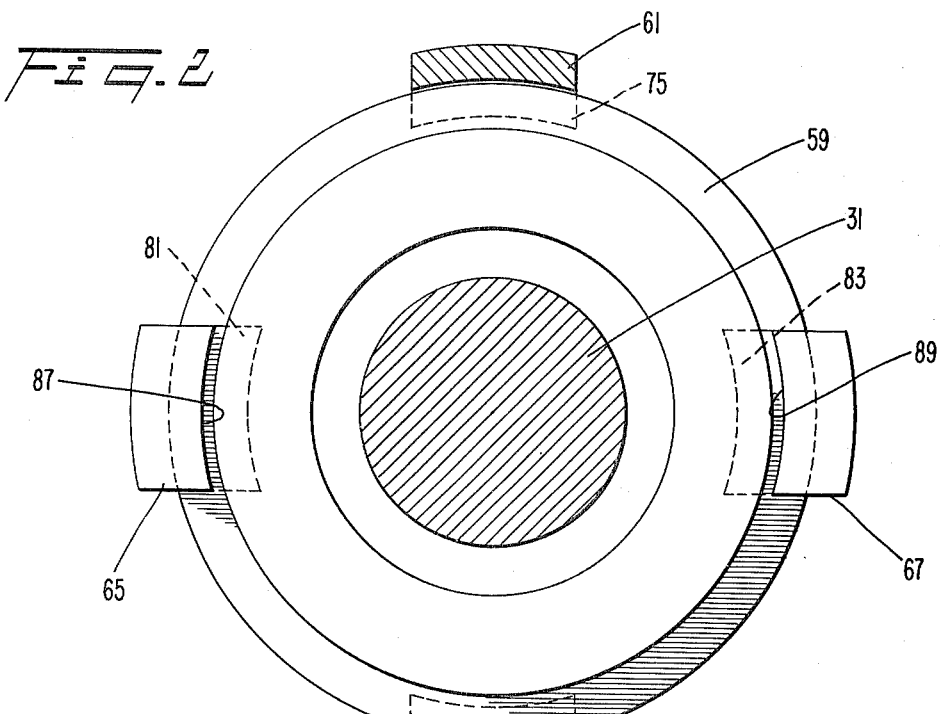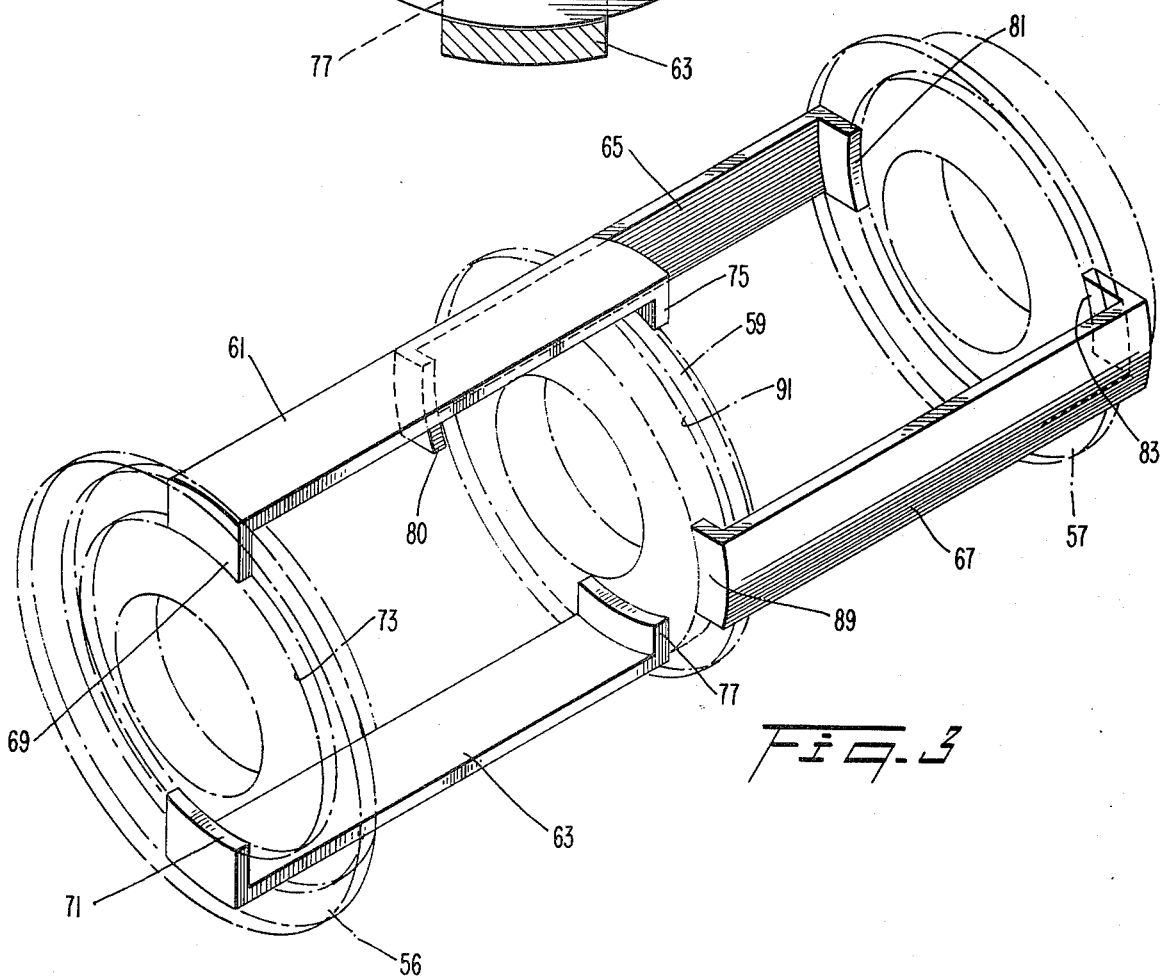

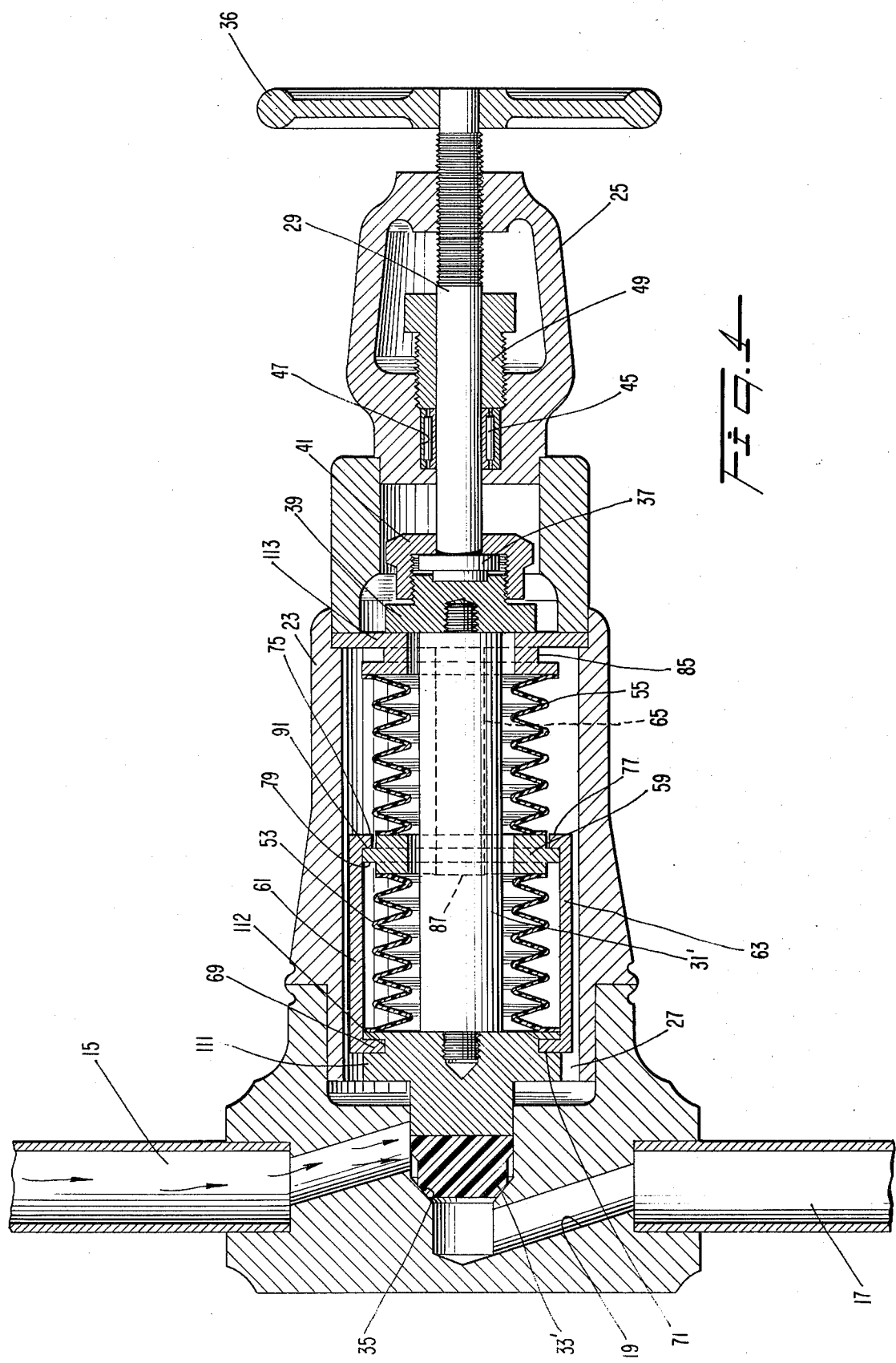

HIGH PRESSURE BELLOWS ASSEMBLY

BACKGROUND OF THE INVENTION

The present invention relates to high pressure bellows assemblies and more particularly to an improved restraining means for limiting the expansion of tandem bellows segments in high pressure installations.

The bellows assemblies to which the present invention relates are those employed to maintain a high pressure seal between relatively movable parts. For example, in a high pressure valve which includes a housing having inlet and outlet ports connected by a passageway, a plug fixed to a movable stem is movable into and out of engagement with a valve seat in the passageway to alternately block and allow passage of pressurized fluid from the inlet to the outlet. The valve stem extends through a pressure chamber in the housing and outwardly thereof for manual manipulation. A packing seal surrounds the stem to prevent loss of pressure from the chamber past the valve stem.

Because of the high pressures involved and the sudden surge of pressure into the chamber occurring when the valve is first opened, it has become customary to employ a bellows seal connected at opposite ends to the housing and the movable valve stem to confine the pressurized fluid to the valve chamber. Any pressurized fluid leaking past the bellows seal is easily handled by the stem packing.

One of the problems which has arisen in these bellows seals, particularly where the bellows has considerable length, is non-uniform expansion and contraction of the bellows convolutions which occurs during valve stem movement. The end convolutions are the first to expand when the valve stem is moved in a direction expanding the bellows and are consistently exposed to greater fluid pressure (and more rapid wear) than the intermediate convolutions.

Also, high pressure in the system can cause some of the bellows convolutions to remain stacked (contracted) so that when the valve stem is moved in a direction requiring bellows expansion, other convolutions are caused to overextend. Again, fluid pressure and wear concentrate at the overextended convolutions and result in premature bellows failure.

One approach to solving these problems is to replace the single bellows length with shorter, individual, tandemly arranged bellows segments which are connected by floating collars. To insure that each bellows segment expands properly and to limit the maximum expansion for each bellows segment, the valve housing and stem are both formed with stop surfaces which, during bellows expansion, cooperate with corresponding ones of the floating collars. The shorter length of the tandemly arranged bellows segments and the insurance that each segment expands properly and that no convolutions overextend greatly enhance the life expectancy of the bellows assembly.

However, this arrangement requires that both the valve housing and valve stem be specially designed with stop surfaces which are positioned to cooperate with the floating collars in the bellows assembly. This involves several expensive machining operations of both the valve housing and valve stem and requires careful matching of bellows assemblies to valve housings and stems.

It has also been proposed to use bellows assemblies provided with headed elongated rods which are freely (floatingly) disposed within tandem bellows segments. Here, the headed rods abut the floating collars and limit the expansion of each bellows segment. The disposition of the rods internally of the bellows segments makes this construction difficult to build and to service and repair. Furthermore, the floating or loose mounting of the rods relative to the floating collars results in noisy operation and a device which is susceptible to failure in use.

SUMMARY OF THE INVENTION

A principal object of the present invention, therefore, is to overcome the above-described problems and disadvantages by providing a high pressure bellows assembly which insures relatively uniform expansion and contraction and prevents overextension of the bellows convolutions, and which permits ready incorporation into standard installations such as high pressure valves without requiring expensive modifications to the valve body or valve stem. The bellows assembly of this invention may be constructed of a variety of sizes and lengths, is a self-contained, modular assembly which is readily incorporated in a valve, and is simple in construction, sturdy, and reliable in use.

Additional objects and advantages of the invention will be set forth in part in the description which follows, and in part, will be obvious from the description, or may be learned by practice of the invention. The objects and advantages of the invention will be realized and attained by means of the instrumentalities and combinations, particularly pointed out in the appended claims.

To achieve the objects and in accordance with the purpose of the invention as embodied and broadly described herein, the invention includes a high pressure bellows assembly for use with apparatus including a housing having a pressure chamber and stem means mounted for longitudinal movement in the pressure chamber and extending outward of the housing, the bellows assembly comprising: at least two bellows segments arranged in tandem and adapted to be positioned in the pressure chamber around the stem means, one end of the bellows assembly having means for sealing attachment to the housing, and the other end having means for sealing attachment to the stem means, a floating collar sealingly interconnecting adjacent ends of tandem bellows segments; means for allowing free contraction of but limiting the expansion of the bellows segments including at least one elongated restraining member disposed exteriorly of, and axially spanning an individual one of each of the bellows segments, the restraining members spanning adjacent bellows segments being arranged out of axial alignment with each other; the at least one restraining member which spans the bellows segment attached to the housing being fixed relative to the housing and including abutment means engageable with the adjacent floating collar, the at least one restraining member which spans the bellows segment attached to the stem means being fixed relative to the stem means and including abutment means engageable with the adjacent floating collar.

The accompanying drawings, which are incorporated in and constitute a part of the specification, illustrate several embodiments of the invention and together with the description, serve to explain the principles of the invention.

BRIEF DESCRIPTION OF THE DRAWINGS

FIG. 1 is a longitudinal cross-sectional view of a high pressure valve assembly showing the valve in an "open" position and illustrating a preferred form of the invention of the internal pressure type incorporated therein;

FIG. 2 is an enlarged sectional view of a portion of FIG. 1 taken along the line 2—2 thereof;

FIG. 3 is a perspective view showing the preferred form of bellows retainer construction of the present invention; and FIG. 4 is a view similar to FIG. 1 of a high pressure valve assembly shown in the "closed" position and with a modified form of the invention of the external pressure type incorporated therein

DETAILED DESCRIPTION

Referring now to FIG. 1, a high pressure valve assembly in which the present invention finds particular use is generally indicated at 11 and includes a valve housing made up of a valve body 13 having fluid pressure inlet 15 and outlet 17 connected by a passageway 19. The valve housing further includes an intermediate bonnet 21, a bonnet 23, and a yoke 25 welded in tandem fashion to each other and to the valve body 13 and forming a pressure chamber 27. A valve stem 29 is threaded in the yoke 25 and has a valve stem extension 31 extending through the pressure chamber 27 and provided with a valve plug 33 engageable with a valve seat 35 in the passageway 19.

In the position of the parts shown in FIG. 1, the valve plug 33 is spaced from the valve seat 35 and pressurized fluid can flow from inlet 15 to outlet 17. When valve stem 29 is moved axially toward the left, as seen in FIG. 1, valve plug 33 engages valve seat 35 and blocks communication between inlet 15 and outlet 17. A hand wheel 36 facilitates turning of the valve stem 29 and axial movement of the valve stem extension 31 and valve plug 33.

The valve stem 29 has a flanged end 37 trapped against adapter 39 by a nut 41, while the adapter 39 threadedly receives a reduced end 43 of the valve stem extension 31. The valve stem 29, adapter 39, nut 41, extension 31, and plug 33 further form valve stem means. The connection between the valve stem 29 and valve stem extension 31 is a slip fit, such that as the valve stem 29 is turned by hand wheel 36 and moved axially, the adapter 39 and valve stem extension 31 move axially with the valve stem 29 but do not turn. A fluid packing 45 is disposed in a cavity 47 in yoke 25 and is forced into sealing engagement around valve stem 29 by a gland 49.

It will be appreciated that when the valve stem means are moved to the position shown in FIG. 1 to open the valve, pressurized fluid enters the pressure chamber 27 in the valve housing. The sudden surge of high pressure fluid in the chamber 27 can exceed the capacity of packing 45, and to prevent this, a bellows seal assembly 51 is provided which confines the high pressure fluid to chamber 27 and prevents its escape to the packing 45. The Bellows seal assembly is of the internal pressure type i.e., it confines pressurized fluid which escapes past the valve plug 33 internally of itself.

In accordance with the invention, bellows seal assembly 51 includes a plurality of bellows segments arranged in tandem in the pressure chamber with one end of the assembly having means for sealing attachment to the valve housing and the other end having means for sealing attachment to the valve stem means. As embodied herein, the bellows seal assembly 51 includes first and second bellows segments 53, 55 arranged in tandem. Bellows segment 53 is sealingly attached as by welding to an annular member 56 which, in turn, is fixed to the valve housing by welding to the bonnet 23. Bellows segment 55 is sealingly attached as by welding to an annular member 57 which, in turn, is welded to the valve stem adapter 39. Thus, when the valve is open as shown in FIG. 1, pressurized fluid escaping past valve plug 33 is confined within the bellows assembly 51 and is not allowed to escape the pressure chamber 27 and impose severe pressure on packing 45.

In accordance with the invention, a floating collar sealingly interconnects adjacent ends of the tandemly arranged bellows segments. As embodied herein, a floating collar 59 is positioned between adjacent ends of bellows segments 53, 55 and is sealed thereto as by welding.

In accordance with the invention, means is provided which allows free contraction of, but limits the expansion of the bellows segments 53, 55. As embodied herein, at least one and preferably two elongated strap-like members 61, 63 are disposed exteriorly of and axially span bellows segment 53. Similarly, at least one and preferably two elongated strap-like members 65, 67 are disposed exteriorly of and axially span bellows segment 55 (see also FIGS. 2 and 3). Elongated members 61, 63 are disposed on diametrically opposite sides of bellows segment 53 as are members 65, 67 with respect to segment 55, and members 61, 63 are oriented 90° relative to members 65, 67 so as to be out of axial alignment therewith.

In accordance with the invention, the elongated restraining members spanning the bellows segments at the ends of the bellows seal assembly 51 are fixed relative to the housing and the valve stem means, respectively. In addition, these restraining members include abutment means engageable with the floating collar at the other end of the associated bellows segment for limiting expansion of that segment. As embodied herein, the restraining members 61, 63 have inturned flanges 69, 71 at one end which are secured in a recess 73 in annular member 56 as by welding. The other ends of restraining members 61, 63 overreach the floating collar 59 and include inturned flanges 75, 77 which are engageable with a shoulder 79 thereon to limit expansion of bellows segment 53.

Similarly, restraining members 65, 67 have inturned flanges 81, 83 at one end which are secured in a recess 85 in annular member 57 as by welding, and inturned flanges 87, 89 which are engageable with another shoulder 91 on collar 59 to limit expansion of bellows segment 55.

In operation, when the valve is opened, the valve stem means is moved in a right hand direction, as seen in FIG. 1, from a position where valve plug 33 is engaged with valve seat 35, toward the position shown in the figure. Initially, both bellows segments 53, 55 are partially contracted and the inturned flanges 75, 77 on restraining members 61, 63 are spaced from shoulder 79 on collar 59, as are inturned flanges 87, 89 on restraining members 65, 67 spaced from collar shoulder 91. As the valve stem means begins movement, bellows segment 55 expands first to a point where flanges 75, 77 on members 61, 63 engage shoulder 79. Continued right-hand directional movement of the valve stem means sees no further expansion of bellows segment 55 but now, bellows segment 53, which may have already begun expanding, accommodates all further movement of the valve stem means. When the valve is fully open, as shown in FIG. 1, inturned flanges 87, 89 on restraining members 65, 67 will have approached shoulder 91 on floating collar 59 but will not have come into engagement therewith.

If for any reason bellows segment 55 does not achieve full expansion first, as described above, bellows segment 53 expands only to the extent where inturned flanges 87, 89 engage collar shoulder 91. Since collar 59 is prevented from further movement, continued right-hand movement of the valve stem 29 is accommodated by expansion of bellows segment 55.

It will be appreciated that the length of the restraining members 61, 63 and 65, 67, more particularly the position of the flanges 75, 77 and 87, 89 relative to the collar shoulders 79, 91, is selected so that neither of the bellows segments 53, 55 can overextend. This greatly reduces the possibility that any of the convolutions of further bellows segment 53, 55 will overextend and helps prevent premature failure of the bellows assembly.

It will further be appreciated that the bellows assembly 51 of this invention is constructed such that it requires little or no structural changes to the valve itself. Specifically, no stop surfaces or the like need be formed either on the valve body or on valve stem as was done in some prior art devices. The bellows assembly of this invention is a self-contained modular unit and is constructed for easy installation in many standard valve constructions with little or no modification thereof. This greatly reduces the added cost and increases the versatility of this invention in that one standard bellows seal assembly can be used with several different valves.

Still further, it will be appreciated that the disposition of the restraining members 61, 63 and 65, 67 externally of the bellows segments 53, 55 helps support the bellows segments laterally, and also makes it relatively easy to construct the bellows assembly 51. Further, by fixing one end of each of the restraining members to one rigid part of the bellows assembly, noise in operation is minimized and the overall assembly is rendered more reliable.

A modified form of the invention is shown in FIG. 4. In this form the fluid pressure which surges past the valve plug is confined in the pressure chamber externally of a bellows seal assembly 51 rather than internally as was done in the embodiment of FIGS. 1 and 2. In the embodiment of FIG. 4, the valve housing is substantially the same as shown in FIG. 1. The valve stem extension 31' in FIG. 4 is connected to an annular member 111 which, in turn, has the valve plug 33' secured thereto.

As embodied in FIG. 4, the bellows segment 53 has one end sealingly attached to annular member 111, as by welding, while bellows segment 55 has one end sealingly attached to an annular member 113 also by welding. Member 113 is sealingly secured to the valve housing by welding to the bonnet 23 as shown. Like the embodiment of FIG. 1, adjacent ends of bellows segments 53, 55 are sealingly attached by welding to floating collar 59.

Also, as embodied in FIG. 4, restraining members 61, 63 have their inturned flanges 69, 71 secured in a recess 112 in annular member 111, while restraining members 65, 67 have their inturned flanges secured in a recess 85 in annular member 113. As in the embodiment of FIGS. 1 and 2, restraining members 61, 63 and 65, 67 overreach floating collar 59 and have inturned flanges 75, 77 and 87, 89 which are positioned to engage shoulders 79, 91, respectively, on the collar 59.

In operation, when it is desired to close the valve, the valve stem means is moved in a left-hand direction toward the position shown in FIG. 4 by turning the hand wheel 36. Initially, both bellows segments 53, 55 are partially contracted and bellows segment 53 expands first until flanges 75, 77 on restraining members 61, 63 engage collar shoulder 79. Thereafter, bellows segment 55, which may have already begun to expand, undergoes further expansion until the valve plug 33' engages valve seat 35. In this position, inturned flanges 87, 89 will have approached but will not have contacted collar shoulder 91.

In all other respects, the construction of FIG. 4 is substantially the same as that of FIG. 1 and like numerals refer to similar parts.

It will be appreciated that while bellows assemblies containing two bellows segments are specifically disclosed herein, assemblies using more that two bellows segments are also contemplated and are within the scope of this invention. In those cases, the restraining members associated with intermediate bellows segments would be fixed to one floating collar and abuttingly engageable with the other. Also, the restraining members associated with each bellows segment are angularly offset with respect to the restraining members associated with each adjacent bellows segment.

Also, the present invention contemplates that bellows assemblies can be made up of two or more modules each having two or more bellows segments in which case the adjacent modules can be joined end-to-end, for example, by welding the annular members at one end of each module together.

While preferred embodiments of the present invention have been illustrated and described in detail and have been shown in a particular installation, i.e., in a high pressure valve, it will be appreciated that the invention finds use in other installations and that various additions, substitutions, modifications and omissions may be made thereto without departing from the spirit of the invention.

I claim:

1. A high pressure bellows assembly for use within a housing having a pressure chamber and stem means mounted for longitudinal movement in the pressure chamber and extending outwardly of said housing; said bellows assembly comprising:

at least two bellows segments arranged in axially spaced tandem relationship and adapted to be positioned in said chamber around said stem means, one end of said bellows assembly having means for sealing attachment to said housing, and the other end having means for sealing attachment to said stem means, a floating collar sealingly interconnecting adjacent ends of said tandem segments;

means disposed entirely exteriorly of said bellows segments for allowing free contraction of but limiting the expansion of said bellows segments including at least one elongated restraining member axially spanning an individual one of each said bellows segments, the restraining members spanning adjacent bellows segments being arranged out of axial alignment with each other;

said at least one restraining member which spans the bellows segment attached to said housing being fixed relative to said housing and including abutment means engageable with the adjacent floating collar, said at least one restraining member which spans the bellows segment attached to said stem means being fixed relative to said stem means and including abutment means engageable with the adjacent floating collar.

2. A high pressure bellows assembly as claimed in claim 1, the expansion limiting means for each said bellows segments including a pair of restraining members with the members of each pair disposed on diametrically opposite sides of the associated bellows segment.

3. A high pressure bellows assembly as claimed in claim 2, the restraining members spanning each bellows segment being oriented 90° relative to the restraining members spanning the adjacent bellows segment.

4. A high pressure bellows assembly as claimed in claim 1, said bellows assembly having annular members fixed to each end thereof and adapted to be sealingly connected to said housing and said valve stem means, respectively.

5. A high pressure bellows assembly as claimed in claim 1, said assembly including two bellows segments sealingly interconnected at their adjacent ends to said floating collar.

6. A high pressure bellows assembly as claimed in claim 4, said restraining members including elongated strap-like members having inturned flanges at each end and spanning an individual one of each of said bellows segments, the strap-like members spanning the bellows segment fixed to said housing having inturned flanges secured to the annular member adapted to be fixed to said housing, the strap-like members spanning the bellows segment fixed to said stem means having inturned flanges secured to the annular member adapted to be fixed to said stem means, all of said strap-like members having inturned flanges positioned to abuttingly engage the floating collar interconnecting their associated bellows segment with its adjacent bellows segment.

7. In a high pressure valve assembly including a valve housing having an inlet and an outlet interconnected by a passageway, a valve seat in said passageway, a pressure chamber in said housing communicated with said valve seat, valve stem means supported for longitudinal movement in said pressure chamber and having a valve plug engageable with said valve seat and extending outwardly of said housing, a bellows assembly in said pressure chamber for preventing loss of pressurized fluid from said chamber when said valve plug is spaced from said valve seat, said bellows assembly including a plurality of bellows segments arranged in axially spaced tandem relationship surrounding said valve stem, a floating collar sealingly interconnecting adjacent ends of said tandem segments, means sealingly interconnecting opposite ends of said bellows assembly to said housing and said valve stem means, respectively; the improvement which comprises means disposed entirely exteriorly of said bellows segments allowing free contraction and limiting expansion of the bellows segments including at least one elongated restraining member axially spanning an individual one of each of said bellows segments, each said elongated member being fixed to said opposite ends of its respective bellows segment and having means at the other end thereof abuttingly engageable with said collar to limit expansion of said bellows segments.

8. The improvement as claimed in claim 7, said bellows assembly having annular members at opposite ends forming the means sealingly interconnecting said bellows assembly to said housing and value stem means.

9. The improvement as claimed in claim 8, said members which axially span the bellows segments at opposite ends of said bellows assembly being fixed to the respective annular members at said bellows assembly ends.

* * * * *